July 31, 1923.
C. A. CONGER
VEHICLE LOCK
Filed June 3, 1920
1,463,760
2 Sheets—Sheet 1
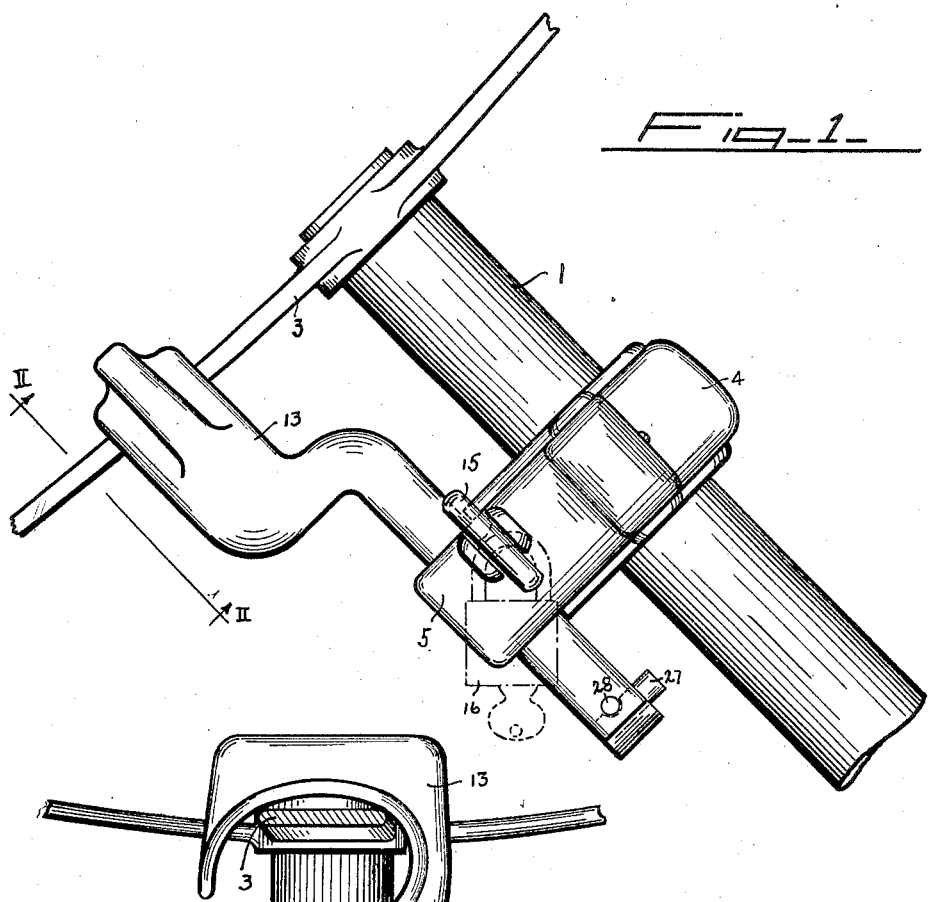
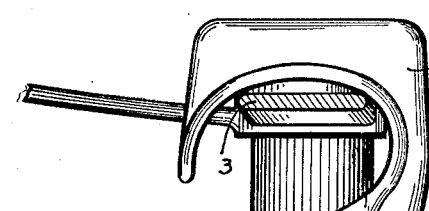
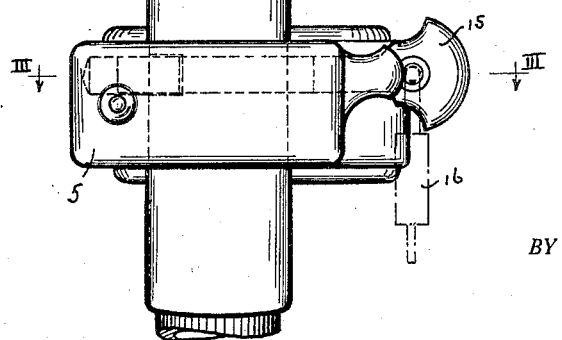
INVENTOR.
Charles A. Conger
BY
Miller & Henry
ATTORNEYS.

July 31, 1923.
C. A. CONGER
VEHICLE LOCK
Filed June 3, 1920
1,463,760
2 Sheets-Sheet 2
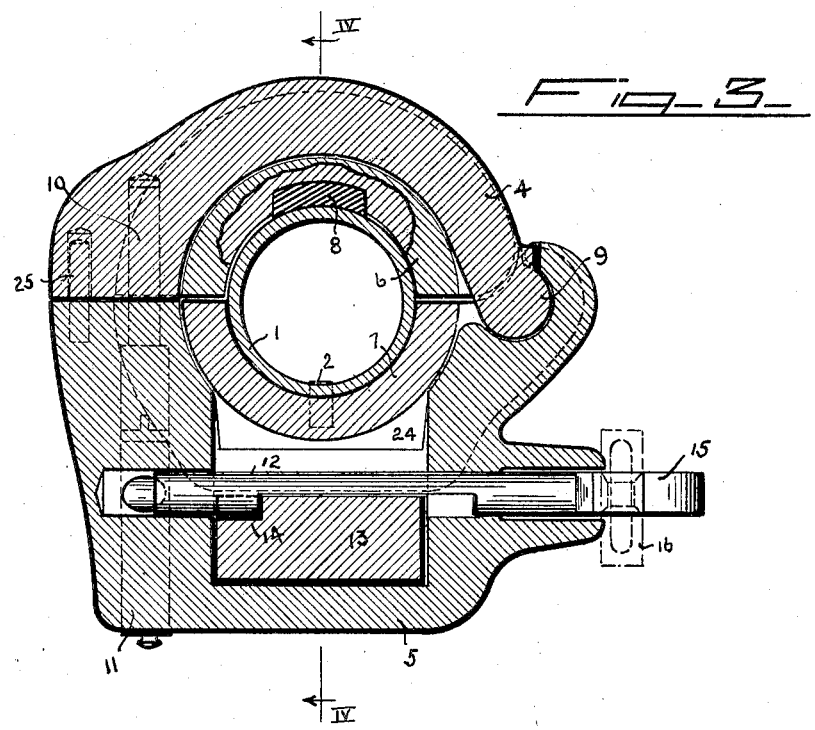
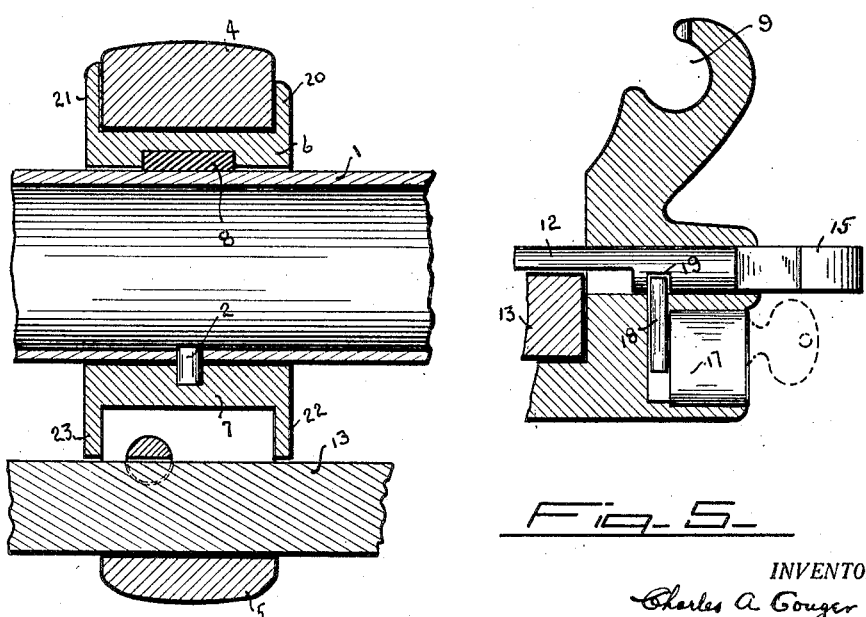
INVENTOR.
Charles A. Conger
BY Miller & Henry
ATTORNEYS.

Patented July 31, 1923.

1,463,760

UNITED STATES PATENT OFFICE.

CHARLES A. CONGER, OF OAKLAND, CALIFORNIA, ASSIGNOR TO NATIONAL AUTO DEVICES COMPANY, OF SAN FRANCISCO, CALIFORNIA, A CORPORATION OF CALIFORNIA.

VEHICLE LOCK.

Application filed June 3, 1920. Serial No. 386,201.

*To all whom it may concern:*

Be it known that I, CHARLES A. CONGER, a citizen of the United States, and a resident of Oakland, county of Alameda, and State of California, have invented new and useful Improvements in Vehicle Locks, of which the following is a specification.

My invention has for its object the securing of an automobile or the like against theft, but still permitting its free movement over a short distance in an emergency where this is advisable, as for example, within the fire limits of municipalities, etc.

In the preferred form I mount the lock on the steering column of the vehicle so that the projecting hook or dog may be raised to engage, and depress in locking position with the driving wheel; or when unlocked and detached from the driving wheel the said dog may be freely depressed entirely out of position leaving the wheel clear to operate without interference. Other objects will appear from the drawings and specification which follow.

A preferred form of the lock and its association with the steering column and wheel of an automobile is indicated in the following figures:

Figure 1 is a perspective view of my lock in place on the steering column and in locked engagement with the steering wheel.

Fig. 2 is an end view of said lock with portions of the steering wheel cut away to better disclose the manner in which the lock engages the spokes of the wheel, and is taken on the line II—II of Fig. 1.

Fig. 3 is a cross section of the locking portions around the steering column on the line III—III of Fig. 2.

Fig. 4 is a cross section on the line IV—IV of Fig. 3.

Fig. 5 shows a variation of the lock means employing a well known form of morticed tumbler lock.

Throughout the figures similar numerals refer to identical parts.

The steering column of the automobile is indicated by the numeral 1, in which a small hole is drilled for receiving the pin 2. One of the spokes of the steering wheel is shown by the numeral 3. The body of the lock 1 is shown as made of two principal parts, a rear portion 4 and a front portion 5, which are adapted to part for rapid assembly around the steering column. Within these two parts I arrange a parting bushing consisting of the members 6 and 7 and within these latter is mounted the pin 2 which engages in the aforesaid hole in the steering column. Within the member 6 I prefer to insert a rubber washer 8 which engages elastically against the surface of the steering column 1 so that any possibility of rattling is prevented. The members 6 and 7 are engageable for different diameters of steering columns while retaining the parts 4 and 5 as duplicates for all vehicles. The parts are assembled by interlocking the piece 4 with the piece 5 as by the recess joint shown at 9, whereupon the part 4 carrying the member 6 and the part 5 carrying the member 7 are hinged together and clamped in place by the screw 10 (see Fig. 3). The hole through which the screw 10 has been inserted is then plugged with the pin 11, the said pin having a circular key cut upon its surface, whereby the detent 12 may travel through said key way and lock said pin 11 from being withdrawn. The members 4 and 5 are therefore securely fixed to the steering column 1, and it is impossible to remove them without removing the detent 12 from its engagement with the pin 11.

The hook 13 is adapted to travel through a suitably formed slot in the member 5, and having one of its surfaces pass freely through the cut-out portion of the detent 12. On the hook 13 is formed a suitable recess 14 wherein the circular portion of the detent 12 will engage when in its locking position, and upon the pulling outward of the detent 12 as shown in Fig. 2, other positions, as that of extreme downward position of the hook may also be arranged to lock by duplicating the slot 14 corresponding with the said other positions, or instead of arranging the detent recess 14 in the position shown in Fig. 3, it may be located at any other suitable point on the surface of the stem 13, and the detent bar correspondingly associated therewith. On the exposed end of the detent 12 I form the finger member 15, whereby the detent bar may be drawn outward so that a circular portion will engage the recess 14 when the hook is in any desired locking position and the padlock 16 shown in dotted lines in Fig. 1, 2 and 3, may thereupon be inserted in the perforated finger end and the detent bar thus locked against disengagement. The hook 13 may thus be retained in locked engagement with the steering wheel 3 and the steering column 1, and the automobile is thus locked against steering. A stop pin 27 retained by a flush pin 28 is inserted in the lower end of the hooked bar 13 to prevent the removal of the hook from the body portion of the lock. In the alternate construction indicated in Fig. 5, the lock barrel 17 carrying the rotatable tumbler 18 is adapted to engage with the slot 19 in the detent bar 12 when the latter is in locking engagement with the hook 13, thereupon providing a substitute for the padlock 16 in Figs. 1, 2 and 3. On the outer periphery of the members 6 and 7 I form collars as indicated at 20, 21, 22, and 23, such that the parts 4 and 5 are locked to the said collars 6 and 7 against end movement thereon, and on the periphery of the half collar 7 I form the spacing flange 24 to prevent rotation of the said half collar with respect to the part 5.

The operation is as follows:

A hole is drilled in the column 1 to receive the pin 2, and the part 5 with the half collar 7 seated therein is now placed against the steering column. The part 4 is now inserted at the joint 9 and hinged thereabout until the dowel pin 25 engages the parts 4 and 5 together. The screw 10 is now inserted through the hole in the piece 5 and the parts tightly secured together thereby. The pin 11 is now inserted to fill the hole and the detent bar 12 slipped into full closed position. The hook 13 is now inserted into its passage way in the part 5, the pin 27 fitted therein, and the pin 28 driven home flush with the surface of the bar 13. The lock is now fully assembled, and the hook 13 may be raised to engage with the arm 3 and locked in the position shown in Fig. 2, and the detent bar withdrawn by the finger piece 15 until it occupies the position indicated in Fig. 3, when the padlock 16 will securely lock the steering wheel against any possible movement, thus preventing the use of the vehicle until the lock 16 is removed, the finger piece 15 pressed in until the detent bar 12 disengages the slot 14 of the hook bar 13, then the lock may be raised and the steering wheel disengaged and the hook dropped into its down position when the steering wheel is free for use.

Reference is herein made to United States Letters Patent No. 1,237,753, issued August 21, 1917, and to my application Serial No. 112,554 filed August 1, 1916.

I claim:

1. In a lock for a vehicle steering wheel and column, a body of two parts adapted to interlock on one side and an inset screw engaging the parts on the other side of the said column whereby said body is secured to said column, a filler piece closing the opening in the body to said inset screw, a movable detent engaging said filler piece to hold the piece in place in the opening, a member adapted to engage the said wheel and slidable through said body to clear said wheel when disengaged therefrom, said detent constructed and adapted to move to interlock with said member when the member engages the wheel and lock means adapted to lock said detent in its moved position.

2. A vehicle lock as set forth in claim 1 wherein the said lock means comprises a barrel lock having a tumbler adapted to rotate into or out of a slot in said detent and in which said detent has a finger-operable-extension external to said body.

3. A vehicle lock as set forth in claim 1 wherein the parts of the body are provided with a parting bushing adapted to snugly fit the said column and a rubber inset in one of the parts and means in the other part to engage an opening in the said column.

4. A vehicle lock as set forth in claim 1 wherein the said lock means comprises a barrel lock having a tumbler adapted to rotate into or out of a slot in said detent and in which said detent has a finger-operable-extension external to said body, and wherein the parts of the body are provided with a parting bushing adapted to snugly fit the column and means carried by one of the parts engaging the body against movement on the column; whereby the body may be adapted to fit various sized columns by varying only the parting bushing.

5. In a lock for a vehicle steering wheel and column, comprising a body having two parts adapted to interlock in hinged relation on one side and an inset screw to secure the two parts on the other side of said column, a shank slidable in said body and having a member adapted to engage the steering wheel on one end thereof, a barrel lock set flush within said body and constructed and adapted to lock said shank when the member engages the steering wheel.

In testimony whereof, I have hereunto set my hand at San Francisco, California, this 29th day of May, 1920.

CHARLES A. CONGER.